US008118549B2

(12) United States Patent
Schiavo

(10) Patent No.: US 8,118,549 B2
(45) Date of Patent: Feb. 21, 2012

(54) GAS TURBINE TRANSITION DUCT APPARATUS

(75) Inventor: Anthony L. Schiavo, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 848 days.

(21) Appl. No.: 12/198,413

(22) Filed: Aug. 26, 2008

(65) Prior Publication Data

US 2010/0054928 A1 Mar. 4, 2010

(51) Int. Cl.

| | |
|---|---|
| ***F01D 1/00*** | (2006.01) |
| ***F01D 25/24*** | (2006.01) |
| ***F01D 9/00*** | (2006.01) |
| ***F03B 1/00*** | (2006.01) |
| ***F03B 11/02*** | (2006.01) |
| ***F03B 3/00*** | (2006.01) |
| ***F03D 1/00*** | (2006.01) |
| ***F03D 11/00*** | (2006.01) |
| ***F03D 3/00*** | (2006.01) |
| ***F03D 5/00*** | (2006.01) |
| ***F04D 1/00*** | (2006.01) |
| ***F04D 17/00*** | (2006.01) |
| ***F04D 23/00*** | (2006.01) |
| ***F04D 29/42*** | (2006.01) |

(52) U.S. Cl. .................................................... 415/182.1

(58) Field of Classification Search ................ 415/182.1
See application file for complete search history.

(56) References Cited

U.S. PATENT DOCUMENTS

| | | | | |
|---|---|---|---|---|
| 5,265,412 | A | 11/1993 | Bagepalli et al. | |
| 5,327,869 | A * | 7/1994 | Rembold et al. | 123/502 |
| 6,345,494 | B1 | 2/2002 | Coslow | |
| 6,450,762 | B1 | 9/2002 | Munshi | |
| 6,675,584 | B1 | 1/2004 | Hollis et al. | |
| 6,733,234 | B2 | 5/2004 | Paprotna et al. | |
| 7,090,224 | B2 | 8/2006 | Iguchi et al. | |
| 2006/0185345 | A1 | 8/2006 | Wilson et al. | |
| 2008/0053107 | A1 | 3/2008 | Weaver et al. | |
| 2008/0087020 | A1 | 4/2008 | Hsu et al. | |

OTHER PUBLICATIONS

Mahmut F. Aksit, et al.; High Performance Combustor Cloth Seals; 36th AIAA/ASME/SAE/ ASEE Joint Propulsion Conference and Exhibit; Copyright 2000; p. 2; AIAA-00-3510; The American Institute of Aeronautics and Astronautics Inc.

U.S. Appl. No. 12/205,963; "Turbine Transition duct Apparatus" filed Sep. 5, 2008.

* cited by examiner

*Primary Examiner* — David S Blum

(57) ABSTRACT

A gas turbine transition duct is provided comprising a generally tubular main body having first and second ends, the first end being adapted to be positioned adjacent to a combustor unit and the second end being adapted to be positioned adjacent to a turbine and a collar coupled to the main body second end. The collar may have upper, lower and side portions. At least one of the side portions may be provided with a notched section.

18 Claims, 7 Drawing Sheets

GAS TURBINE TRANSITION DUCT APPARATUS

FIELD OF THE INVENTION

The present invention is directed to a gas turbine transition duct having a collar with at least one notched section, a seal apparatus for sealing a relief opening defined between opposing first and second transition ducts and a gas turbine transition duct apparatus comprising first and second transition ducts and a seal apparatus.

BACKGROUND OF THE INVENTION

A conventional combustible gas turbine engine includes a compressor, a combustor, including a plurality of combustor units, and a turbine. The compressor compresses ambient air. The combustor units combine the compressed air with a fuel and ignite the mixture creating combustion products defining a working gas. The working gases are routed to the turbine inside a plurality of transition ducts. Within the turbine are a series of rows of stationary vanes and rotating blades. The rotating blades are coupled to a shaft and disc assembly. As the working gases expand through the turbine, the working gases cause the blades, and therefore the disc assembly, to rotate.

Each transition duct may comprise a generally tubular main body and a collar coupled to an exit of the main body. The transition ducts may be positioned adjacent to one another. The ducts may include brush seals held via holders coupled to the collars, metallic seal strips trapped in slots within the collars or labyrinth seals welded to or formed as part of the collars so as to prevent hot gases from passes between adjacent transition ducts.

The working gases produced by the combustor units are hot and under a pulsating pressure. The transition ducts are exposed to these high temperature gases and pulsating pressures, and vibrations can cause deflections in various locations of the tubular main bodies and collars. The transition duct is attached to the turbine engine at two points. The first attachment is at the top of the transition duct collar and an internal casing ring. The second attachment is at the inlet ring of the transition duct and the engine case pressure shell. Due the nature of holding a component in a dynamic flow condition with temperature gradients, stress failures may occur, for example, in corner portions of the tubular main bodies.

SUMMARY OF THE INVENTION

In accordance with a first aspect of the present invention, a gas turbine transition duct is provided comprising a generally tubular main body having first and second ends, the first end being adapted to be positioned adjacent to a combustor unit and the second end being adapted to be positioned adjacent to a turbine and a collar coupled to the main body second end. The collar may have upper, lower and side portions. At least one of the side portions may be provided with a notched section.

The notched section may be generally centered along the one side portion.

The notched section may extend between about 30% and about 70% of a length of the one side portion.

In accordance with a second aspect of the present invention, a gas turbine transition duct apparatus is provided comprising a first turbine transition duct, a second turbine transition duct, and seal apparatus. The first turbine transition duct may comprise a first generally tubular main body having first and second ends and a first collar coupled to the main body second end. The first collar may have a first upper portion, a first lower portion and first side portions. At least one of the first side portions may be provided with a first notched section. The second turbine transition duct may comprise a second generally tubular main body having third and fourth ends and a second collar coupled to the main body fourth end. The second collar may have a second upper portion, a second lower portion and second side portions. At least one of the second side portions may be provided with a second notched section. The one first side portion may be positioned adjacent to the one second side portion such that the first and second notched sections are located adjacent to one another. The first and second notched sections may define a relief opening between them. The seal apparatus may comprise a plug associated with the relief opening.

The seal apparatus may comprise a plug plate comprising the plug and support structure integral with the plug, wherein the support structure comprises first and second end portions.

The one first side portion may further comprise upper and lower first recessed sections and the one second side portion may further comprise upper and lower second recessed sections. The support structure first end portion may be received in the upper first and second recessed sections and the support structure second end portion may be received in the lower first and second recessed sections.

The seal apparatus may further comprise a side seal device including a support member comprising a main body and first and second locking tabs. The support member may be adapted to be positioned adjacent to and engage the plug plate.

The one side portion may further comprise first and second slotted sections including respectively first and second slots and the one second side portion may further comprise third and fourth slotted sections including respectively third and fourth slots. The first locking tab may be received in the first and third slots and the second locking tab may be received in the second and fourth slots.

The side seal device may further comprise spring structure coupled to the support member and in engagement with first and second landings on the first and second collars and the first and second generally tubular main bodies so as to retain the support member in position against the plug plate.

The spring structure may comprise first and second spring clips. Each of the first and second spring clips may comprise slots.

In accordance with a third embodiment of the present invention, a seal apparatus is provided and adapted to seal a relief opening defined between opposing first and second transition ducts. The seal apparatus may comprise a plug plate and a side seal device. The plug plate may comprise a plug and an integral support structure. The plug may be positioned within the relief opening. The side seal device may include a support member and spring structure. The support member may be adapted to be positioned adjacent to and engage the plug plate. The spring structure may be associated with the support member and adapted to engage the first and second transition ducts to maintain the support member in engagement with the plug plate.

DETAILED DESCRIPTION OF THE INVENTION

Figure 1:
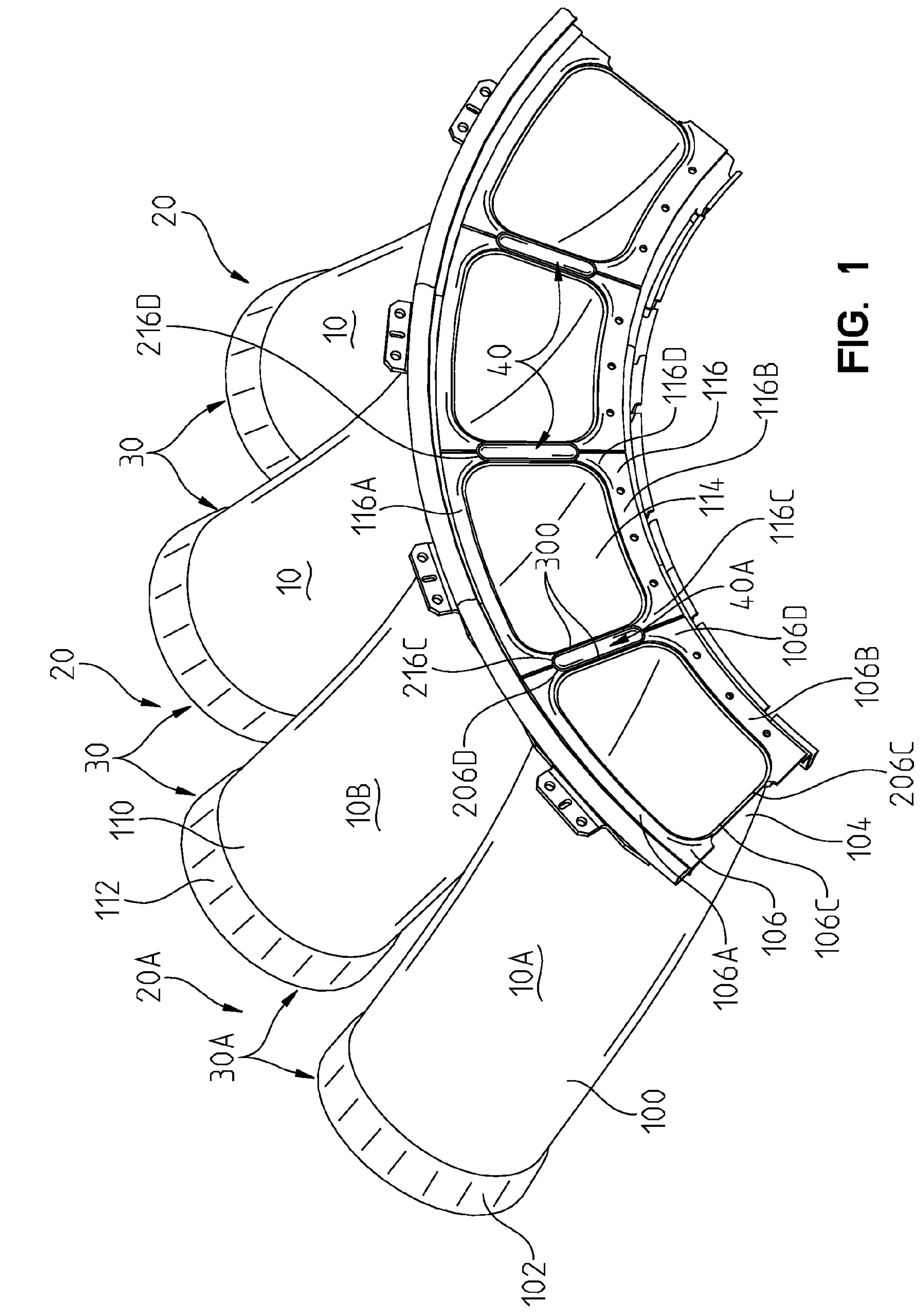
FIG. 1 is a perspective view of a plurality of gas turbine transition duct apparatuses constructed in accordance with the present invention.

In the following detailed description of the preferred embodiment, reference is made to the accompanying drawings that form a part hereof, and which is shown by way of illustration, and not by way of limitation, a specific preferred embodiment in which the invention may be utilized and that changes may be made without departing from the spirit and scope of the present invention.

A conventional combustible gas turbine engine (not shown) includes a compressor (not shown), a combustor (not shown), including a plurality of combustor units (not shown), and a turbine (not shown). The compressor compresses ambient air. The combustor units combine the compressed air with a fuel and ignite the mixture creating combustion products defining a working gas. The working gases are routed from the combustor units to the turbine inside a plurality of transition ducts 10, see FIGS. 1-3. The working gases expand in the turbine and cause blades coupled to a shaft and disc assembly to rotate.

In accordance with the present invention, a plurality of gas turbine transition duct apparatuses 20 are provided, each comprising an adjacent pair 30 of the transition ducts 10 and a seal apparatus 40. Each of the gas turbine transition duct apparatuses 20 may be constructed in the same manner. Hence, only a single gas turbine transition duct apparatus, labeled 20A in the drawings, will be described in detail herein.

Figure 2:
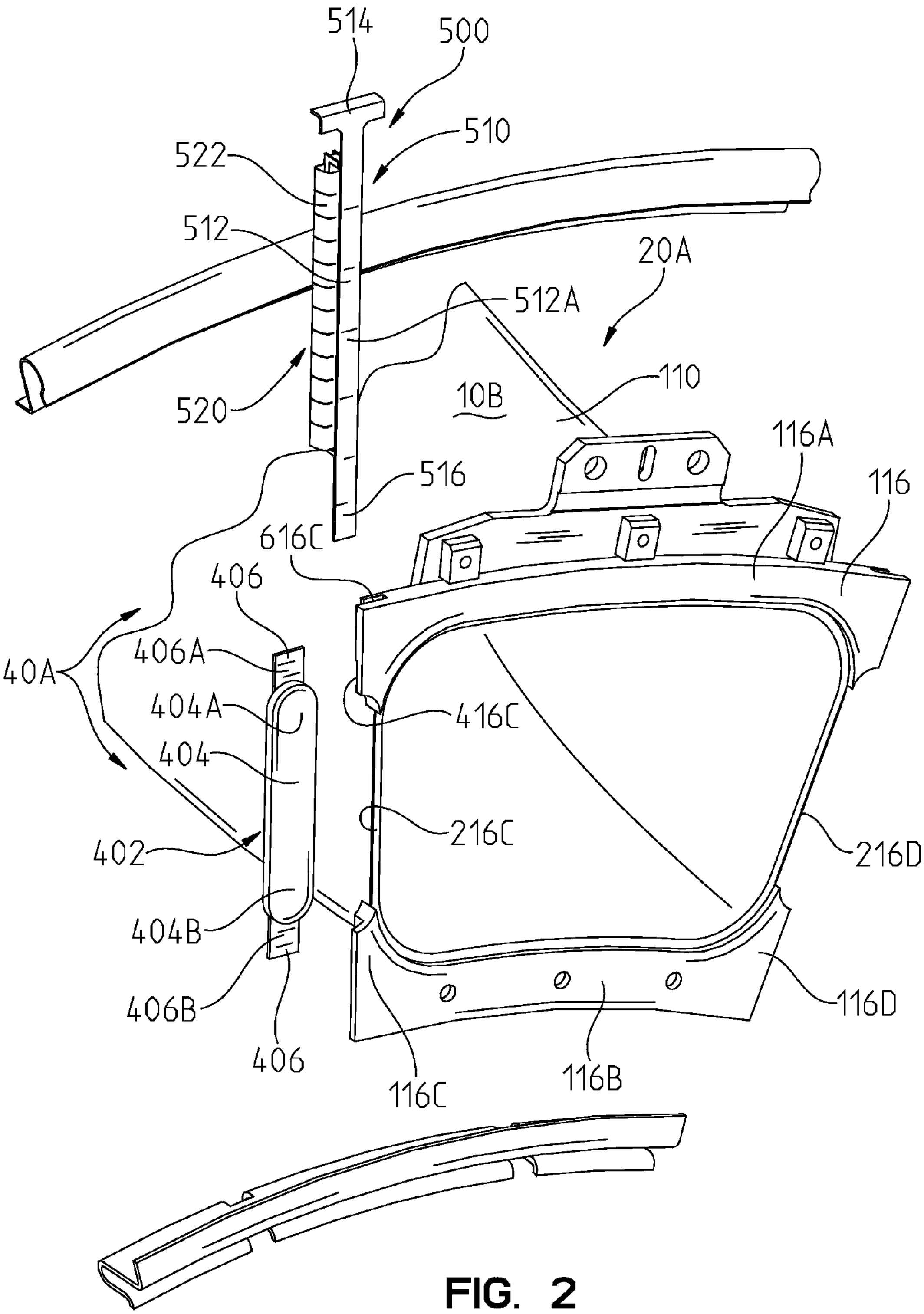
FIG. 2 is an exploded view of a portion of a gas turbine transition duct apparatus.

The gas turbine transition duct apparatus 20A comprises an adjacent transition duct pair 30A including a first transition duct 10A and a second transition duct 10B (only the second transition duct 10B is shown in FIG. 2). The gas turbine transition duct apparatus 20A further comprises a seal apparatus 40A.

The first turbine transition duct 10A comprises a first generally tubular main body 100 having first and second ends 102 and 104 and a first collar 106 coupled to the main body second end 104. The first collar 106 may be formed integrally with the first main body 100 or as a separate element which is welded to the first main body 100. The first collar 106 comprises a first upper portion 106A, a first lower portion 106B and first and second side portions 106C and 106D. The first side portion 106C is provided with a first notched section 206C and the second side portion 106D is provided with a second notched section 206D. The first notched section 206C is generally centered along the first side portion 106C and may extend between about 30% and 70% and, preferably, about 50% of the length of the first side portion 106C. The second notched section 206D is generally centered along the second side portion 106D and may extend between about 30% and 70% and, preferably, about 50% of the length of the second side portion 106D. The first tubular main body 100 and the first collar 106 may be formed from a superalloy such as Inconel 617.

The second turbine transition duct 10B comprises a second generally tubular main body 110 having third and fourth ends 112 and 114 and a second collar 116 coupled to the main body fourth end 114. The second collar 116 may be formed integrally with the second main body 110 or as a separate element which is welded to the second main body 110. The second collar 116 comprises a second upper portion 116A, a second lower portion 116B and third and fourth side portions 116C and 116D. The third side portion 116C is provided with a third notched section 216C and the fourth side portion 116D is provided with a fourth notched section 216D, see FIGS. 1 and 2. The third notched section 216C is generally centered along the third side portion 116C and may extend between about 30% and 70% and, preferably, about 50% of the length of the third side portion 116C. The fourth notched section 216D is generally centered along the fourth side portion 116D and may extend between about 30% and 70% and, preferably, about 50% of the length of the fourth side portion 116C. The second tubular main body 110 and the second collar 116 may be formed from a superalloy such as Inconel 617.

Figure 3:
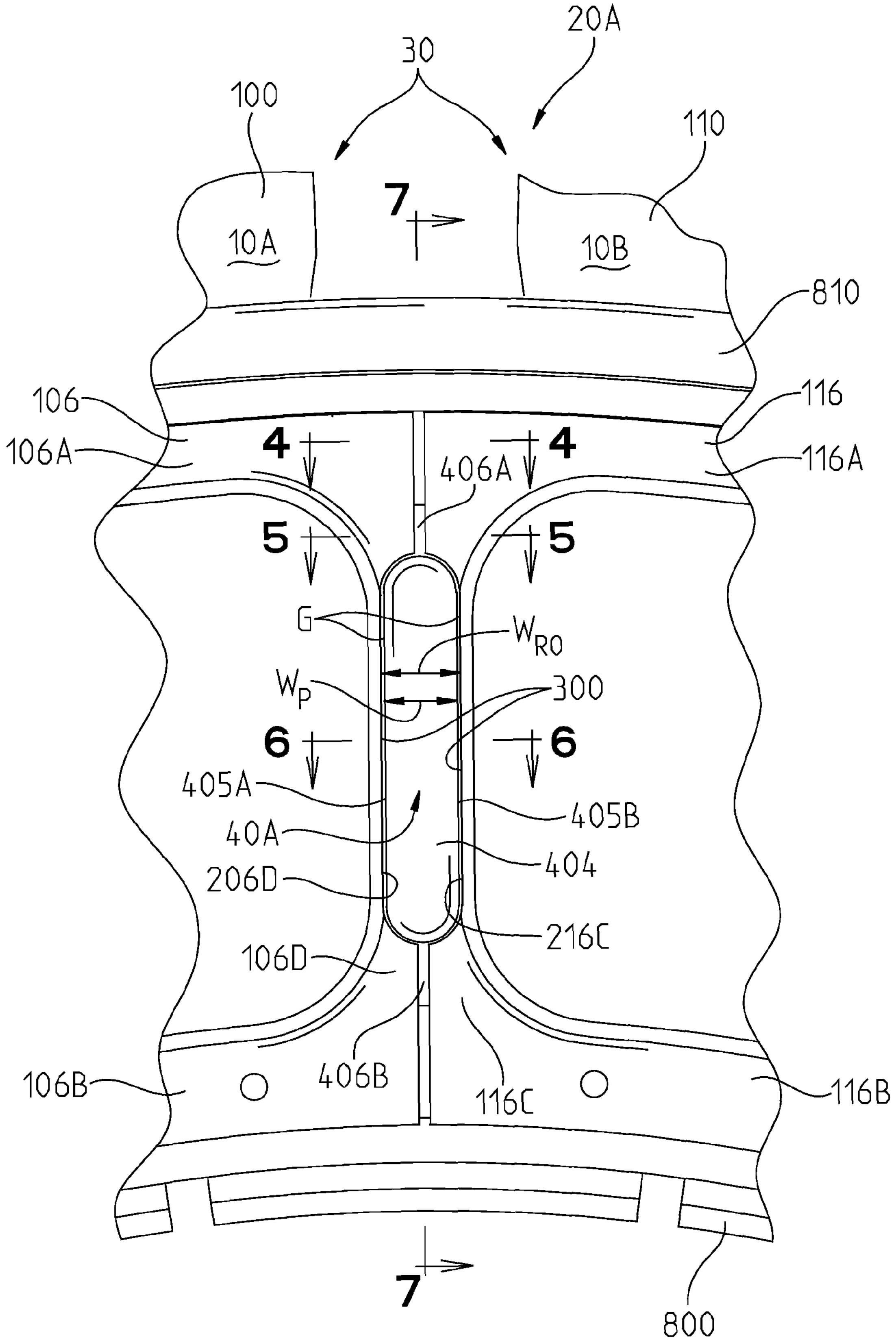
FIG. 3 is a view of a portion of a gas turbine transition duct apparatus.

The first collar second side portion 106D is located next to the second collar third side portion 116C, see FIGS. 1 and 3, such that the second and third notched sections 206D and 216C are located adjacent to one another. The second and third notched sections 206D and 216C define a relief opening 300 between them, see FIGS. 1 and 3. The second and third notched sections 206D and 216C allow the first and second transition ducts 10A and 10B to expand and contract during operation of the gas turbine engine so as to reduce the likelihood that stress failures may occur, for example, in corner portions of the tubular main bodies 100 and 110.

Figure 6:
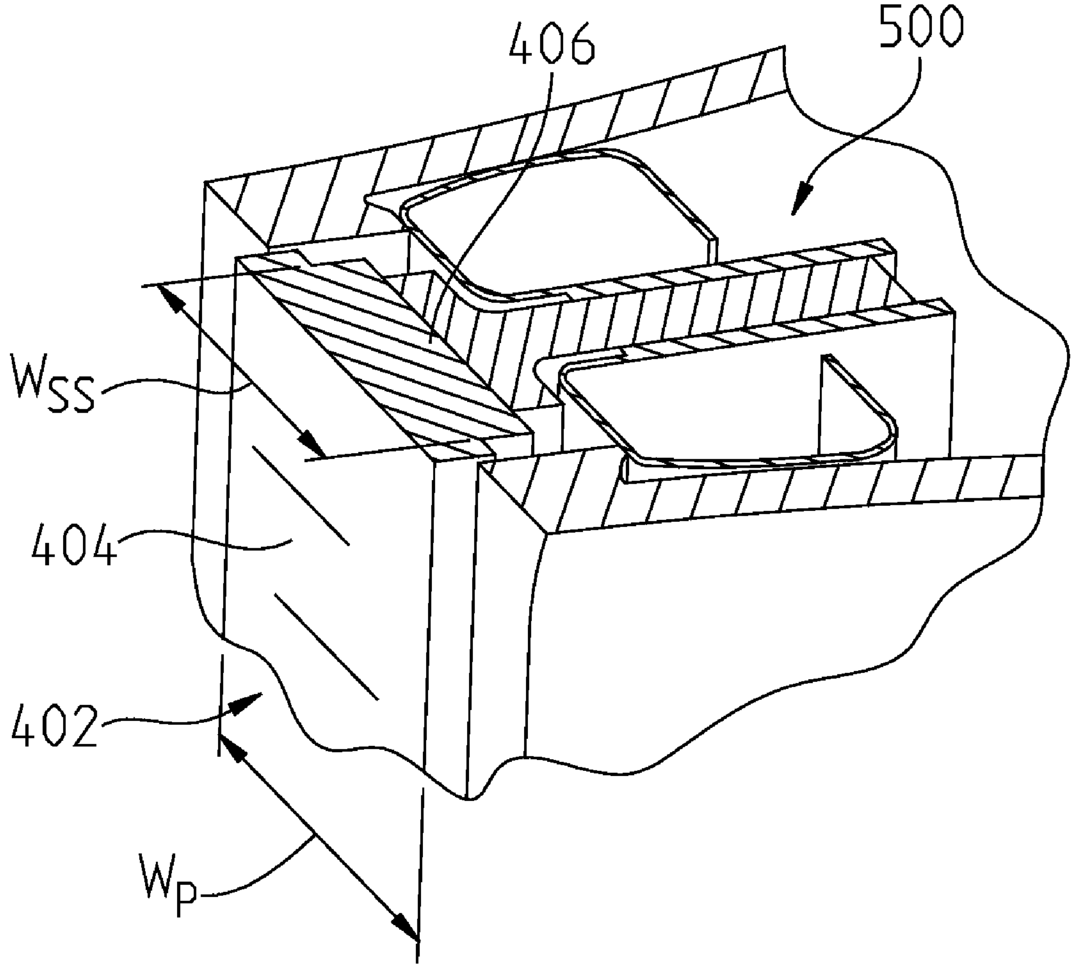
FIG. 6 is a view taken along view line 6-6 in FIG. 3.

The seal apparatus 40A comprises, in the illustrated embodiment, a plug plate 402 comprising a plug 404 and a support structure 406 integral with the plug 404, see FIGS. 2 and 6. The plug plate 402 may be formed from a superalloy, such as Inconel 617 or Hanyes 230, an oxide ceramic matrix composite or a non-oxide ceramic matrix composite. The plug 404 has, in the illustrated embodiment, a generally oval shape, which shape substantially corresponds to the shape of the relief opening 300, but is sized so as to be slightly smaller than the relief opening 300. For example, the plug 404 may have a width $W_P$ of about 26 mm, while the relief opening 300 may have width $W_{RO}$ of about 32 mm, see FIG. 3. Hence, there is about a 3 mm gap G between side edges 405A and 405B of the plug 404 and the second and third notched sections 206D and 216C defining the relief opening 300 so as to allow the second and third side portions 106D and 116C sufficient room to expand during operation of the gas turbine engine without contacting/damaging the plug 404. While not illustrated in the drawings, it is contemplated that the plug 404 may include cooling holes extending completely therethrough.

The support structure 406 has, in the illustrated embodiment, a width $W_{SS}$ less than the width $W_P$ of the plug 404, see FIG. 6. Further, the support structure 406 comprises first and second end portions 406A and 406B, which extend beyond ends 404A and 404B of the plug 404, see FIG. 2.

Figure 5:
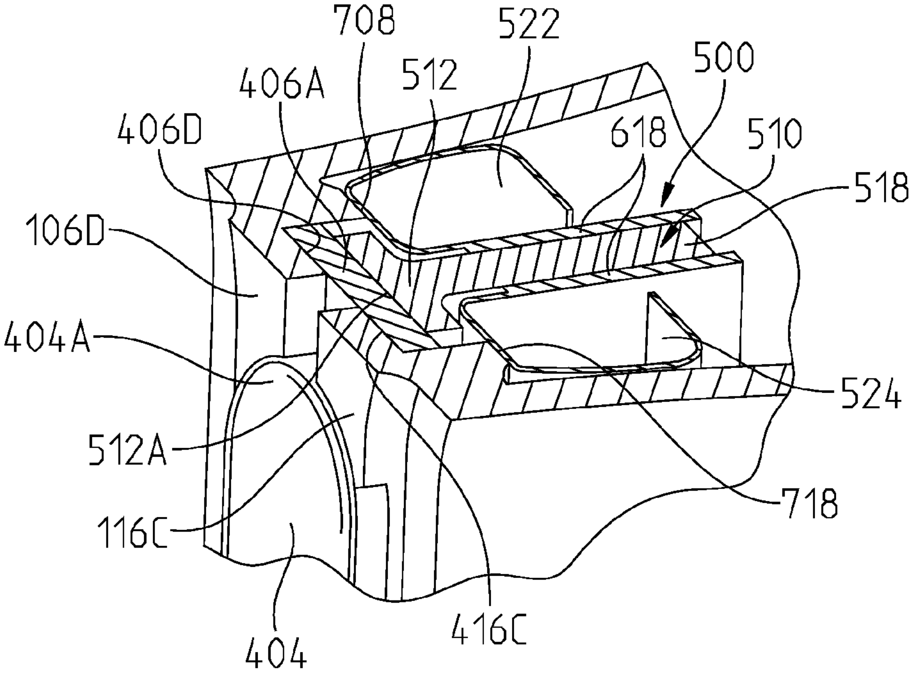
FIG. 5 is a view taken along view line 5-5 in FIG. 3.

In the illustrated embodiment, the second side portion 106D further comprises upper and lower second recessed sections (only the upper second recessed section 406D is illustrated, see FIG. 5). The third side portion 116C further comprise upper and lower third recessed sections 416C and 516C, respectively, see FIGS. 5 and 7. The first end portion 406A of the support structure 406 is axially received in the upper second and third recessed sections 406D and 416C, while the second end portion 406B of the support structure 406 is axially received in the lower second and third recessed sections so as to accurately position the plug 404 axially, radially and circumferentially relative to the relief opening 300. When the plug 404 is properly positioned relative to the relief opening 300, the plug 404 functions to substantially block compressed air, generated by the compressor, from passing through the relief opening 300.

Figure 8:
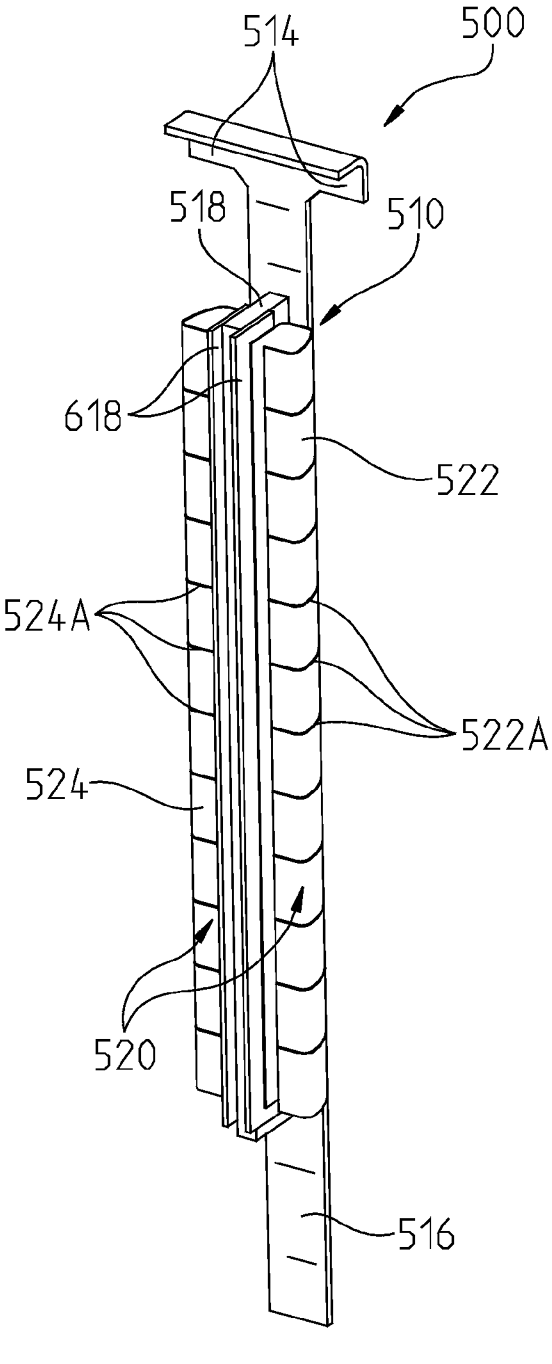
FIGS. 8 and 9 are perspective views of a side seal device of the present invention.
Figure 9:
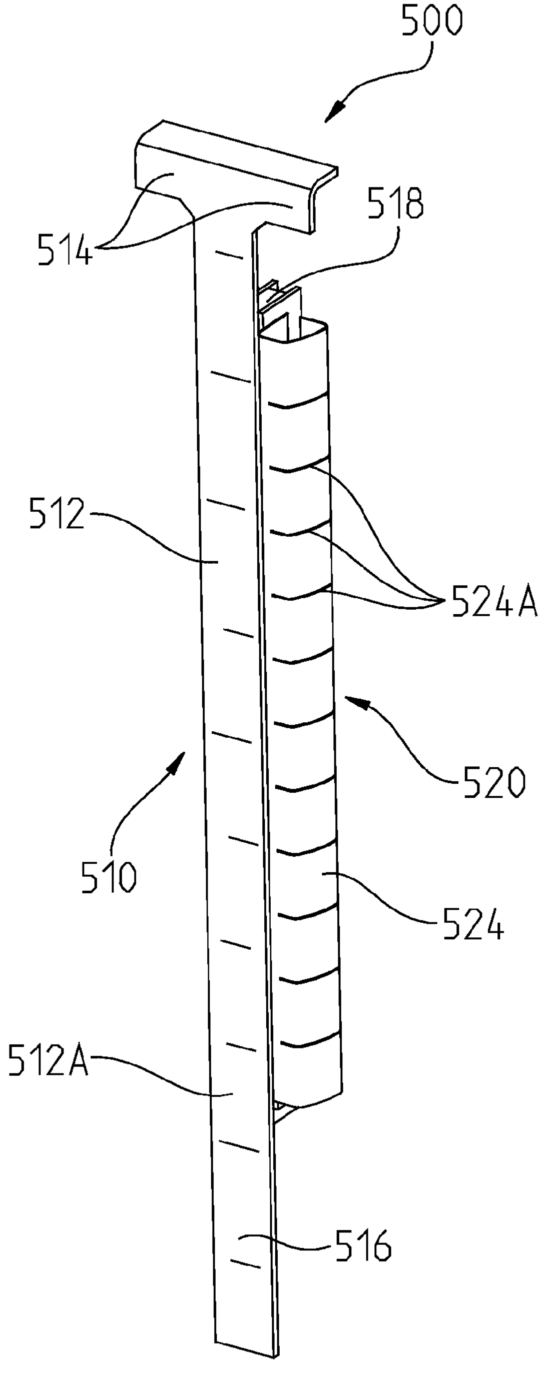

In the illustrated embodiment, the seal apparatus 40A further comprises a side seal device 500 including a support member 510 comprising a main body 512, first and second locking tabs 514 and 516 and a support rib 518, see FIGS. 5, 8 and 9. The main body 512, the first and second locking tabs 514 and 516 and the support rib 518 may be integrally formed from Inconel 617 or Inconel 718. As will be discussed further below, a front side 512A of the main body 512 is adapted to engage the plug plate support structure 406 so as to maintain the plug plate 402 in proper position axially relative to the first and second collars 106 and 116, see FIG. 5.

The side seal device 500 further comprises a spring structure 520 coupled to the support member 510. The spring structure 520 comprises, in the illustrated embodiment, first and second spring clips 522 and 524, which may be formed from Inconel 617 or Inconel 718. The spring clips 522 and 524 are coupled to opposing sides of the main rib 518 of the side seal device support member 510 via welding or brazing, wherein welding or brazing material 618 is illustrated in FIGS. 5 and 8. Each of the first and second spring clips 522 and 524 may comprise slots 522A and 524B.

Figure 4:
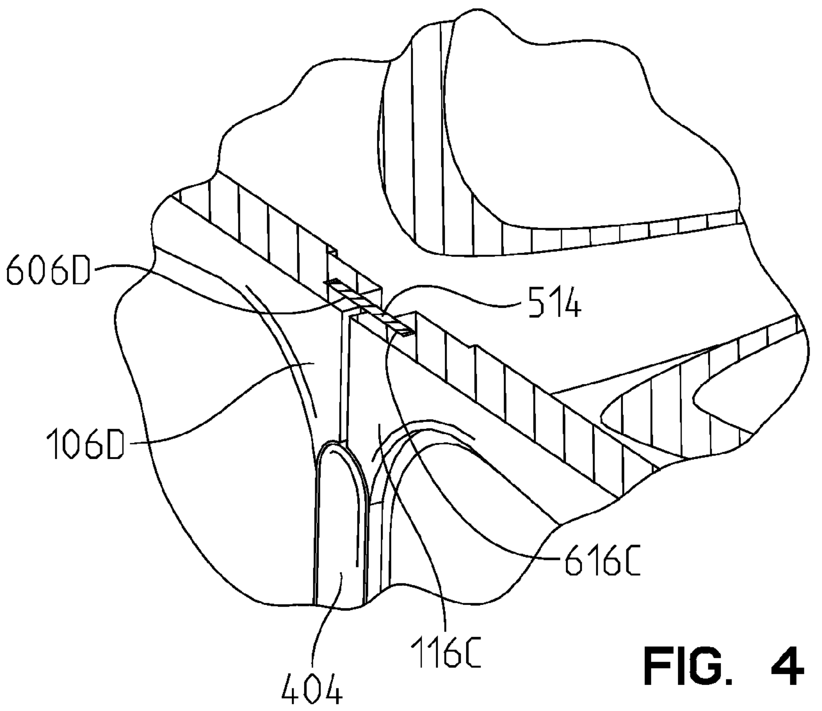
FIG. 4 is a view taken along view line 4-4 in FIG. 3.

In the illustrated embodiment, the second side portion 106D further comprises upper and lower second slotted sections including respectively upper and lower second slots (only the upper second slot 606D is illustrated, see FIG. 4). The third side portion 116C further comprise upper and lower third slotted sections including respectively upper and lower third slots 616C and 716C, respectively, see FIGS. 4 and 7. The first locking tab 514 is received in the upper second and third slots 606D and 616C, while the second locking tab 516 is received in the lower second and third slots.

During assembly of the seal apparatus 40A to the first and second transition ducts 10A and 10B, the plug plate 402 is first axially moved toward the first and second collars 106 and 116 such that the first end portion 406A of the support structure 406 is received in the upper second and third recessed sections 406D and 416C of the second and third side portions 106D and 116C, while the second end portion 406B of the support structure 406 is axially received in the lower second and third recessed sections of the second and third side portions 106D and 116C. Thereafter, the side seal device 500 is radially positioned relative to the first and second collars 106 and 116 such that the first locking tab 514 is inserted into the upper second and third slots 606D and 616C, while the second locking tab 516 is inserted into the lower second and third slots of the of the second and third side portions 106D and 116C. Once the side seal device 500 is properly inserted, the front side 512A of the main body 512 engages the plug plate support structure 406 so as to maintain the plug plate 402 in proper position relative to the first and second collars 106 and 116, see FIGS. 5 and 7. Further, the spring clips 522 and 524 engage first and second landings 708 and 718, see FIG. 5, on the first and second collars 106 and 116 and the first and second generally tubular main bodies 100 and 110 so as to retain the support member 510 in position against the plug plate 402, see FIG. 5.

It is also noted that the slots 522A and 524B provided in the spring clips 522 and 524 allow the spring clips 522 and 524 to expand and contract as the first and second transition ducts 10A and 10B expand and contract during operation of the gas turbine engine. The slots 522A and 524B also define metering slots through which compressed air from the compressor is able to pass through the side seal device 500 and the gaps G between the side edges 405A and 405B of the plug 404 and the second and third notched sections 206D and 216C. The compressed air passing through the gaps G acts to cool outer surfaces of the upper, lower and side portions of the collars 106, 116, which outer surfaces are located downstream from the tubular main bodies 100, 110 as well as the entire region downstream from the collars 106, 116 and prior to the turbine.

Figure 7:
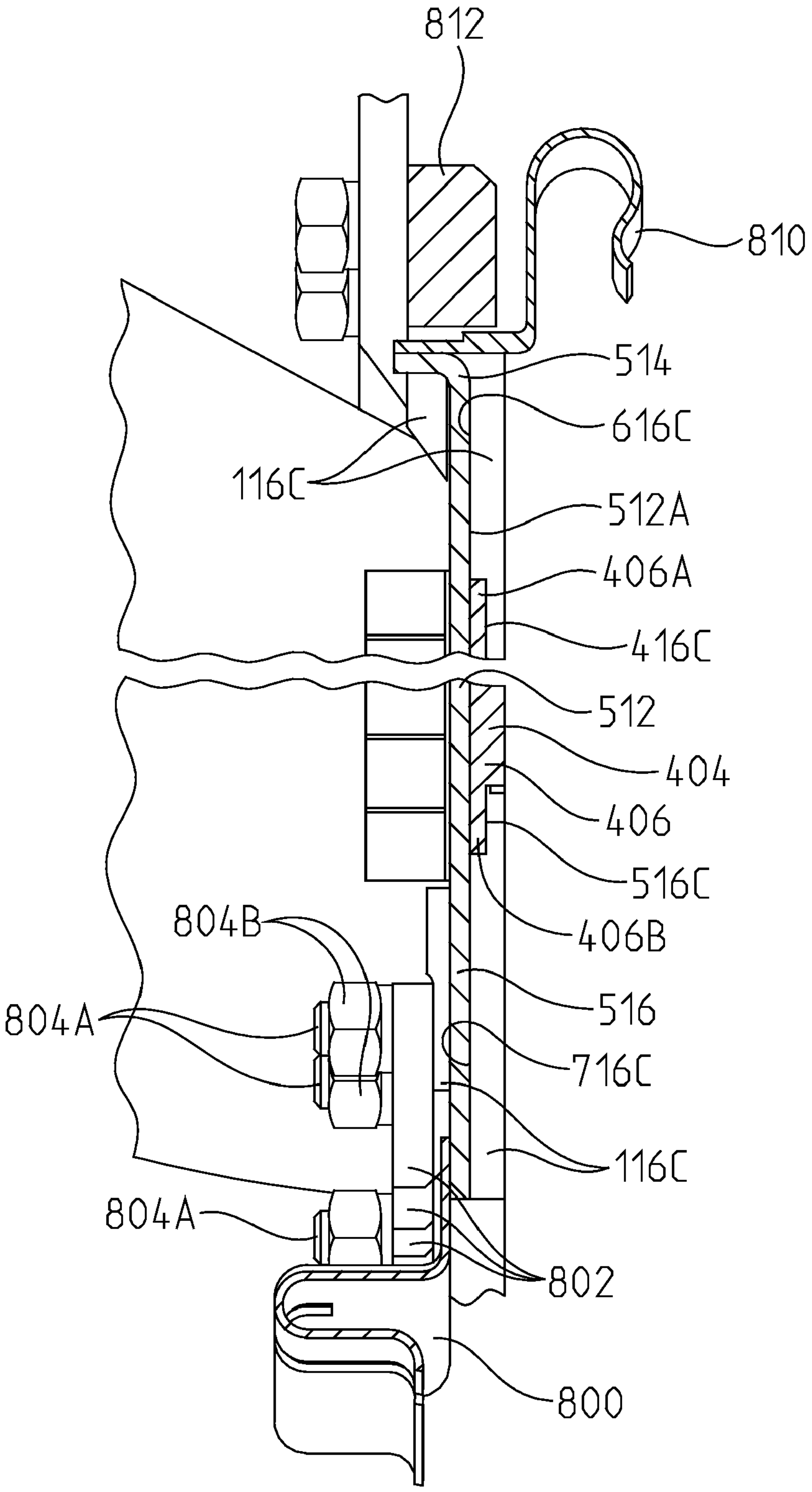
FIG. 7 is a view taken along view line 7-7 in FIG. 3.

An inner seal ring 800 is provided for engaging the second locking tab 516 so as to limit axial movement of the second locking tab 516, see FIG. 7. A plurality of restraining tabs 802 are coupled via bolts 804A and nuts 804B to the collars 106 and 116 so as to limit axial movement of the inner seal ring 800.

An outer seal ring 810 is provided for engaging the first locking tab 514 so as to limit radial movement of the first locking tab 514, see FIG. 7. A support structure 812 is provided for limiting radial movement of the seal ring 810.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine transition duct comprising:

a generally tubular main body having first and second ends, said first end being adapted to be positioned adjacent to a combustor unit and said second end being adapted to be positioned adjacent to a turbine; and a collar coupled to said main body second end, said collar having upper, lower and side portions, at least one of said side portions being provided with a notched section.

2. The gas turbine transition duct as set out in claim 1, wherein said notched section is generally centered along said one side portion.

3. The gas turbine transition duct as set out in claim 2, wherein said notched section extends between about 30% and about 70% of a length of said one side portion.

4. A gas turbine transition duct apparatus comprising:

a first turbine transition duct comprising a first generally tubular main body having first and second ends, and a first collar coupled to said main body second end, said first collar having a first upper portion, a first lower portion and first side portions, at least one of said first side portions being provided with a first notched section;

a second turbine transition duct comprising a second generally tubular main body having third and fourth ends, and a second collar coupled to said main body fourth end, said second collar having a second upper portion, a second lower portion and second side portions, at least one of said second side portions being provided with a second notched section;

said one first side portion being positioned adjacent to said one second side portion such that said first and second notched sections are located adjacent to one another, said first and second notched sections defining a relief opening between them; and seal apparatus comprising a plug associated with said relief opening.

5. The gas turbine transition duct apparatus as set out in claim 4, wherein said seal apparatus comprises a plug plate comprising said plug and support structure integral with said plug, wherein said support structure comprises first and second end portions.

6. The gas turbine transition duct apparatus as set out in claim 5, wherein said one first side portion further comprises upper and lower first recessed sections and said one second side portion further comprises upper and lower second recessed sections, said support structure first end portion being received in said upper first and second recessed sections and said support structure second end portion being received in said lower first and second recessed sections.

7. The gas turbine transition duct apparatus as set out in claim 6, wherein said seal apparatus further comprises a side seal device including a support member comprising a main body and first and second locking tabs, said support member being adapted to be positioned adjacent to and engage said plug plate.

8. The gas turbine transition duct apparatus as set out in claim 7, wherein said one first side portion further comprises first and second slotted sections including respectively first and second slots and said one second side portion further comprises third and fourth slotted sections including respectively third and fourth slots, said first locking tab being received in said first and third slots and said second locking tab being received in said second and fourth slots.

9. The gas turbine transition duct apparatus as set out in claim 8, wherein said side seal device further comprises spring structure coupled to said support member and engaging first and second landings on said first and second collars and said first and second generally tubular main bodies so as to retain said support member in position against said plug plate.

10. The gas turbine transition duct apparatus as set out in claim 9, wherein said spring structure comprises first and second spring clips.

11. The gas turbine transition duct apparatus as set out in claim 10, wherein each of said first and second spring clips comprises slots.

12. Seal apparatus adapted to seal a relief opening defined between opposing first and second transition ducts comprising:

- a plug plate comprising a plug and an integral support structure, said plug being adapted to be positioned within the relief opening; and
- a side seal device including a support member and spring structure, said support member being adapted to be positioned adjacent to and engage said plug plate and said spring structure being associated with said support member and adapted to engage said first and second transition ducts to maintain said support member in engagement with said plug plate.

13. Seal apparatus as set out in claim 12, wherein said support member comprises a main body and first and second locking tabs.

14. Seal apparatus as set out in claim 12, wherein said spring structure comprises first and second spring clips.

15. Seal apparatus as set out in claim 14, wherein each of said first and second spring clips comprises slots.

16. Seal apparatus as set out in claim 14, wherein each of said first and second spring clips comprises slots so as to allow said first and second spring clips to conform to the first and second transition ducts as the ducts deform during operation.

17. Seal apparatus as set out in claim 14, wherein each of said first and second spring clips comprises slots for providing metered cooling for collars of the first and second transition ducts.

18. Seal apparatus as set out in claim 12, wherein said support member is formed from a superalloy.

* * * * *